United States Patent
Matsuoka et al.

(10) Patent No.: US 6,830,792 B1
(45) Date of Patent: Dec. 14, 2004

(54) RESIN STRUCTURE AND USE THEREOF

(75) Inventors: Hideo Matsuoka, Aichi (JP);
Mitsushige Hamaguchi, Aichi (JP);
Kazuhiko Kobayashi, Aichi (JP);
Akira Todo, Yamaguchi (JP); Taku Koda, Yamaguchi (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/089,842

(22) PCT Filed: Oct. 6, 2000

(86) PCT No.: PCT/JP00/06984
§ 371 (c)(1),
(2), (4) Date: Apr. 4, 2002

(87) PCT Pub. No.: WO01/27204
PCT Pub. Date: Apr. 19, 2001

(30) Foreign Application Priority Data

| Oct. 12, 1999 | (JP) | ............................................ 11/290346 |
| Dec. 17, 1999 | (JP) | ............................................ 11/358848 |
| Feb. 17, 2000 | (JP) | ....................................... 2000-039191 |

(51) Int. Cl.[7] ............................ B32B 1/02; B32B 27/08; C08L 23/00
(52) U.S. Cl. .................. 428/35.7; 428/36.9; 428/36.91; 428/412; 428/476.9; 428/483; 428/516; 428/517; 525/64; 525/68; 525/150; 525/189
(58) Field of Search ............................ 525/64, 68, 150, 525/189; 428/35.7, 36.9, 36.91, 412, 476.9, 483, 516, 517

(56) References Cited

U.S. PATENT DOCUMENTS 5,227,427 A 7/1993 Serizawa et al. ........... 524/574

FOREIGN PATENT DOCUMENTS

| JP | 2178339 | 7/1990 |
| JP | 2222452 | 9/1990 |
| JP | 5193061 | 8/1993 |
| JP | 5339502 | 12/1993 |
| JP | 6190980 | 7/1994 |

*Primary Examiner*—Patricia A. Short
(74) *Attorney, Agent, or Firm*—Piper Rudnick LLP

(57) ABSTRACT

Provided is a thermoplastic resin structure formed of a resin composition that comprises substantially (a) from 5 to 80% by volume of a polyolefin resin and (b) from 20 to 95% by volume of a polyphenylene sulfide resin, which is characterized in that, in morphology therein seen through electronic microscopy, the polyphenylene sulfide resin (b) forms a matrix phase (continuous phase) and the polyolefin resin (a) forms a disperse phase. The thermoplastic resin structure gives plastic containers, tubes and their Attached parts having good barrier properties, strength, durability and workability.

17 Claims, 3 Drawing Sheets

RESIN STRUCTURE AND USE THEREOF

TECHNICAL FIELD

The present invention relates to resin structures of good vapor and/or liquid transmission resistance, and their use. In particular, the invention relates to resin moldings of specific transmission resistance and workability, which are obtained by forming a specific morphology of polyolefin resin and polyphenylene sulfide resin (hereinafter referred to as PPS resin) and are favorable for vapor and/or liquid barrier articles, to such resin structures favorable for containers and pipes for storage and transportation of liquid chemicals such as oil and gasoline, to those favorable for wrapping and packaging materials and containers for foods and medicines, and to their use.

BACKGROUND ART

Polyolefin resins such as polyethylene and polypropylene are the most popular plastics that are widely used for daily necessaries, toys, machine parts, electric and electronic parts, and automobile parts. The recent requirement increasing in the art is for gas-barrier (transmission-resistant) resin articles capable of preventing the contents from leaking out and protecting them from the open air for ensuring the safety and the storage stability of the contents and for protecting the environment from pollution. However, since polyolefin resins are poorly resistant to liquid chemical and vapor transmission through them, their use is often limited, and it is desired to improve them.

For improving for the physical properties of such polyolefin resins, resin compositions and moldings consisting of polyolefin resin and polyamide resin of good transmission resistance have heretofore been proposed in the art. The method could improve the transmission resistance of the resin compositions and moldings over that of moldings of polyolefin resin alone, but is still unsatisfactory. Therefore desired is a technique of further improving the transmission resistance of polyolefin resin structures.

For fuel tanks and oil tanks for automobiles, converting metallic containers into plastic containers is now actively investigated, as plastics are lightweight and easy to mold and work, their design latitude is broad, and they are easy to handle. The matter of importance with such plastic containers is that they do not leak the contents and can protect the contents from the open air for ensuring the safety and the storage stability of the contents and for protecting the environment from pollution. Polyethylene, polypropylene and other polyolefin containers are the most popular plastic containers, but their barrier properties against gasoline and other specific oils are unsatisfactory. Therefore, it is difficult to directly use them for fuel tanks and oil tanks for automobiles. For such use, in general, they are worked into multi-layer structures by coating them with a barrier layer of resin of high transmission resistance.

One typical example of the resin to form such a barrier layer is polyamide resin (for example, as in JP-A 220738/1983). However, the recent tendency in the field of automobile fuel is being toward using a mixture of gasoline and alcohol, gasohol, for which the plastic containers obtainable in the above-mentioned prior art are unsatisfactory in point of their barrier properties. Therefore desired is a technique of further improving the barrier properties of plastic containers.

On the other hand, it is known that PPS resin has extremely good barrier properties against liquid chemicals such as gasoline and automobile oil, and against water and carbon dioxide. Blow-molded containers and tubular structures of such PPS resin (for example, as in JP-A 90216/1987, 255832/1986, 32816/1991), and multi-layer structures with a barrier layer formed of a specific PPS resin and a modified polyolefin (for example, as in JP-A 190980/1994) have been proposed. However, since its interlayer adhesiveness to other resin is poor, PPS resin has some problems in that its coextrusion and lamination with other resin materials such as polyethylene, polypropylene and other polyolefins is difficult and its main component must be an expensive specific PPS resin. For these reasons, the application range of PPS resin is limited.

The present invention is to improve the transmission resistance of polyolefin resin, and its object is to provide resin structures of specifically improved liquid chemical and vapor transmission resistance, not detracting from the properties such as toughness, moldability and workability intrinsic to polyolefin resin, especially to provide polyolefin-PPS resin structures favorable for vapor and/or liquid barrier articles, and to provide multi-layer structures of good transmission resistance, moldability, workability, interlayer adhesiveness and toughness that are favorable to plastic containers and can be stably and economically formed into good plastic containers.

DISCLOSURE OF THE INVENTION

We, the present inventors have studied to solve the problems noted above, and, as a result, have found that, when a polyolefin resin and a PPS resin are mixed in a specific ratio optionally along with an inorganic filler in such a controlled manner that the PPS resin phase in morphology in the resulting resin composition could form a dispersed configuration capable of being a continuous phase or a laminar (layered) phase in the shaped structure of the resin composition, then the above-mentioned problems can be solved. On the basis of this finding, we have reached the present invention.

Specifically, the invention provides the following:

(1) A thermoplastic resin structure formed of a resin composition that comprises substantially (a) from 5 to 80% by volume of a polyolefin resin and (b) from 20 to 95% by volume of a polyphenylene sulfide resin, which is characterized in that, in morphology therein seen through electronic microscopy, the polyphenylene sulfide resin (b) forms a matrix phase (continuous phase) and the polyolefin resin (a) forms a disperse phase;

(2) The thermoplastic resin structure of above (1), for which the blend ratio of the polyolefin resin (a) and the polyphenylene sulfide resin (b) is such that the former accounts for from 55 to 80% by volume and the latter for from 20 to 45% by volume;

(3) The thermoplastic resin structure of above (1), for which the blend ratio of the polyolefin resin (a) and the polyphenylene sulfide resin (b) is such that the former accounts for from 60 to 75% by volume and the latter for from 25 to 40% by volume;

(4) A thermoplastic resin structure formed of a resin composition that comprises (a) from 15 to 85% by volume of a polyolefin resin and (b) from 15 to 85% by volume of a polyphenylene sulfide resin, which is characterized in that, in morphology therein seen through electronic microscopy, both the phase of the polyphenylene sulfide resin (b) and the phase of the polyolefin resin (a) are substantially continuous phases;

(5) A thermoplastic resin structure formed of a resin composition that comprises (a) from 55 to 95% by volume of a polyolefin resin and (b) from 5 to 45% by volume of a polyphenylene sulfide resin, which is characterized in that, in morphology therein seen through electronic microscopy, the polyolefin resin (a) forms a continuous phase and the polyphenylene sulfide resin (b) forms a laminar disperse phase;

(6) The thermoplastic resin structure of any of (1) to (5), for which the polyolefin resin (a) is at least one selected from polyethylene, polypropylene, ethylene/α-olefin copolymers, [copolymers of (ethylene and/or propylene) and (unsaturated carboxylic acid and/or unsaturated carboxylate)], and [copolymers of (ethylene and/or propylene) and (unsaturated carboxylic acid and/or unsaturated carboxylate) in which at least a part of the carboxyl groups are modified into metal salts];

(7) The thermoplastic resin structure of any of (1) to (6), which contains (c) from 0.5 to 200 parts by weight, relative to 100 parts by weight of the total of the polyolefin resin (a) and the polyphenylene sulfide resin (b), of an inorganic filler;

(8) Containers for transportation or storage of liquid chemicals or gases, which are obtained by working the thermoplastic resin structure of any of (1) to (7);

(9) Attached parts for containers for transportation or storage of liquid chemicals or gases, which are obtained by working the thermoplastic resin structure of any of (1) to (7);

(10) Moldings of the thermoplastic resin structure of any of (1) to (7), which are formed in at least one method of injection molding, injection compression molding or compression molding;

(11) A multi-layer structure with a barrier layer, in which the barrier layer is formed of the thermoplastic resin structure of any of (1) to (7);

(12) The multi-layer structure of (11), wherein a neighboring layer is formed on one or both surfaces of the barrier layer, and the neighboring layer is a thermoplastic resin layer differing from the thermoplastic resin structure that forms the barrier layer;

(13) The multi-layer structure of (12), wherein the thermoplastic resin to form the neighboring layer is at least one selected from polyolefin resins, thermoplastic polyester resins, polyamide resins, polycarbonate resins and ABS resins;

(14) The multi-layer structure of (12), wherein the thermoplastic resin to form the neighboring layer is at least one selected from polyolefin resins, thermoplastic polyester resins and polyamide resins;

(15) The multi-layer structure of (12), wherein the thermoplastic resin to form the neighboring layer is an ethylene homopolymer and/or an ethylene/α-olefin copolymer having a melt flow rate of from 0.01 to 30 g/10 min and a density of from 0.90 to 0.97 g/cm$^3$;

(16) The multi-layer structure of (12), which has an adhesive layer formed between the barrier layer and the neighboring layer;

(17) The multi-layer structure of (16), wherein the adhesive layer is formed of a modified polyolefin having a degree of crystallinity of at most 50% and containing from 0.01 to 10% by weight of an unsaturated carboxylic acid or its derivative grafted thereon;

(18) The multi-layer structure of (17), wherein the adhesive layer comprises from 60 to 99 parts by weight of a modified polyolefin having a degree of crystallinity of at most 50% and containing from 0.01 to 10% by weight of an unsaturated carboxylic acid or its derivative grafted thereon, and from 1 to 40 parts by weight of a tackifier;

(19) The multi-layer structure of any of (11) to (18), which is formed through coextrusion;

(20) The multi-layer structure of any of (11) to (19), which is formed into multi-layered tubes or multi-layered blow moldings through coextrusion.

BEST MODES OF CARRYING OUT THE INVENTION

Figure 1:
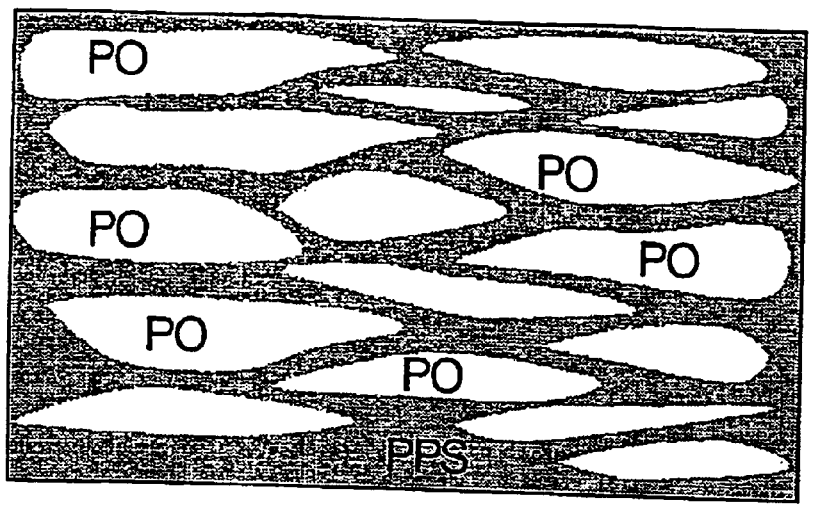
FIG. 1 shows a model of the morphology of a resin structure in which the continuous phase is formed of a PPS resin component (PPS) and the disperse phase is formed of a polyolefin resin component (PO).

Embodiments of the invention are described below. "Weight" referred to herein means "mass".

The polyolefin resin (a) for use in the invention is a thermoplastic resin prepared through polymerization or copolymerization of olefins such as ethylene, propylene, butene, isoprene, and pentene. Concretely, it includes homopolymers such as polyethylene, polypropylene, polystyrene, polyacrylate, polymethacrylate, poly-1-butene, poly-1-pentene, polymethylpentene; as well as ethylene/α-olefin copolymers, vinyl alcohol ester homopolymers, polymers prepared by at least partially hydrolyzing vinyl alcohol ester homopolymers, [polymers obtained by at least partially hydrolyzing copolymers of (ethylene and/or propylene) and vinyl alcohol ester], [copolymers of (ethylene and/or propylene) and (unsaturated carboxylic acid and/or unsaturated carboxylate)], [copolymers of (ethylene and/or propylene) and (unsaturated carboxylic acid and/or unsaturated carboxylate) in which at least a part of the carboxyl groups are modified into metal salts], block copolymers of conjugated diene and vinyl-aromatic hydrocarbon, and hydrogenated derivatives of the block copolymers.

Of those, preferred are polyethylene, polypropylene, ethylene/α-olefin copolymers, [copolymers of (ethylene and/or propylene) and (unsaturated carboxylic acid and/or unsaturated carboxylate)], and [copolymers of (ethylene and/or propylene) and (unsaturated carboxylic acid and/or unsaturated carboxylate) in which at least a part of the carboxyl groups are modified into metal salts]; and more preferred are low-, middle- and high-density polyethylene, polypropylene, and ethylene/α-olefin copolymers.

Polypropylene for use herein is not specifically defined, and may be any of isotactic, atactic or syndiotactic polypropylene. Apart from such homopolymers, also usable in the invention are block or random copolymers comprising at least 70% by weight of a propylene component and containing some other olefin component.

Ethylene/α-olefin copolymers for use in the invention are copolymers of ethylene and at least one α-olefin having from 3 to 20 carbon atoms, in which, concretely, the α-olefin having from 3 to 20 carbon atoms includes propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and their combinations. Of those, preferred are α-olefins having from 3 to 12 carbon atoms, as the mechanical strength of the copolymers comprising any of them is high. The α-olefin content of the ethylene/α-olefin copolymer preferably falls between 1 and 30 mol %, more preferably between 2 to 25 mol %, even more preferably between 3 and 20 mol %.

The copolymers may be further copolymerized with at least one non-conjugated diene such as 1,4-hexadiene, dicyclopentadiene, 2,5-norbornadiene, 5-ethylidenenorbornene, 5-ethyl-2,5-norbornadiene, 5-(1'-propenyl)-2-norbornene.

The unsaturated carboxylic acid in the [copolymers of (ethylene and/or propylene) and (unsaturated carboxylic acid and/or unsaturated carboxylate)] is any of acrylic acid or methacrylic acid or their mixture; and the unsaturated carboxylate therein includes, for example, methyl, ethyl, propyl, butyl, pentyl, hexyl, heptyl, octyl, nonyl and decyl esters of such unsaturated carboxylic acids, and their mixtures. Especially preferred are ethylene/methacrylic acid copolymers, and ethylene/methacrylic acid/acrylate copolymers.

Preferably, the melt flow rate (hereinafter referred to as MFR, under ASTM D1238) of the polyolefin resin (a) for use in the invention falls between 0.01 and 70 g/10 min, more preferably between 0.03 and 60 g/10 min. If its MFR is lower than 0.01 g/10 min, the resin is unfavorable since its flowability is not low; but if higher than 70 g/10 min, the resin is also unfavorable since its mechanical strength is low. The polyolefin resin of which the MFR falls within the preferred range may also be one prepared by thermally decomposing a polymerized polyolefin resin with an organic peroxide.

The method of preparing the polyolefin resin (a) for use in the invention is not specifically defined, for which, for example, employable is any of radical polymerization, coordination polymerization with a Ziegler-Natta catalyst, anionic polymerization, or coordination polymerization with a metallocene catalyst.

Preferably, the polyolefin resin (a) for use in the invention is modified with at least one compound selected from unsaturated carboxylic acids or their derivatives. The modified polyolefin resin is highly miscible with other resin, and has the ability to well control the separated morphology in the resulting resin composition, and, as a result, the transmission resistance of the resin structure is improved. Using the modified polyolefin resin is one preferred embodiment of the invention.

Examples of the unsaturated carboxylic acids or their derivatives that serve as the modifying agent are acrylic acid, methacrylic acid, maleic acid, fumaric acid, itaconic acid, crotonic acid, methylmaleic acid, methylfumaric acid, mesaconic acid, citraconic acid, glutaconic acid, and metal salts of these carboxylic acids; and methyl hydrogenmaleate, methyl hydrogenitaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo-(2,2,1)-5-heptene-2,3-dicarboxylic acid, endobicyclo-(2,2,1)-5-heptene-2,3-dicarboxylic acid anhydride, maleimide, N-ethylmaleimide, N-butylmaleimide, N-phenylmaleimide, glycidyl acrylate, glycidyl methacrylate, glycidyl methacrylate, glycidyl itaconate, glycidyl citraconate, and 5-norbornene-2,3-dicarboxylic acid. Of those, preferred are unsaturated dicarboxylic acids and their anhydrides; and especially preferred are maleic acid and maleic anhydride.

The method of introducing such an unsaturated carboxylic acid or its derivative component into polyolefin resin is not specifically defined. For example, the essential ingredient, olefin compound may be copolymerized with an unsaturated carboxylic acid or its derivative compound; or a non-modified polyolefin resin may be grafted with an unsaturated carboxylic acid or its derivative compound in the presence of a radical initiator. In any of such methods, the acid or derivative component may be introduced into polyolefin resin. The amount of the unsaturated carboxylic acid or its derivative component to be introduced into polyolefin preferably falls between 0.001 and 40 mol %, more preferably between 0.01 and 35 mol % of all the olefin monomers that constitute the modified polyolefin.

The PPS resin (b) for use in the invention is a polymer having repetitive units of the following structural formula (I):

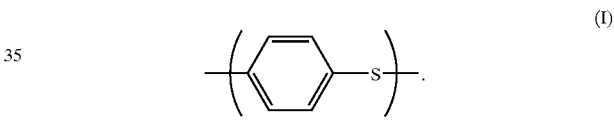

From the viewpoint of its heat resistance, the polymer preferably contains at least 70 mol %, more preferably at least 90 mol % of the repetitive units of the structure formula. The PPS resin may contain any other repetitive units such as those mentioned below, within a range smaller than 30 mol % of all the repetitive units that constitute the resin.

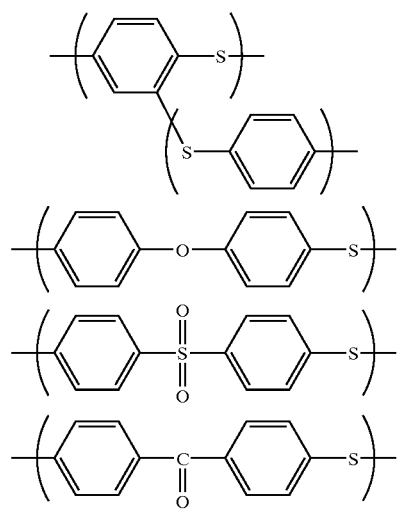

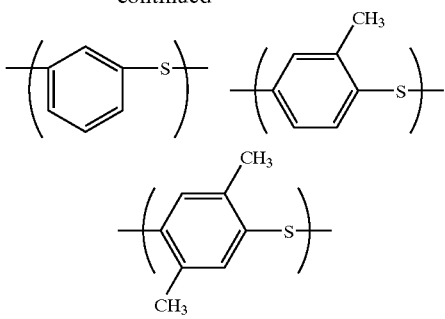

The PPS polymer partly having the structure as above will have a lowered melting point. Therefore, in case where the melting point of the thermoplastic resin not in the barrier layer of the multi-layer structure of the invention is low, the PPS resin of the type is advantageous in point of its moldability.

The melt viscosity of the PPS resin for use in the invention is not specifically defined, so far as the resin can be kneaded in melt. In general, it falls between 50 and 20000 poises (at 320° C. at a shear rate of 1000 sec$^{-1}$), more preferably between 100 and 5000 poises.

The PPS resin of the type can be prepared in any known method, for example, according to the method for preparing polymers having a relatively small molecular weight, described in JP-B 3368/1970; or the method for preparing polymers having a relatively large molecular weight, described in JP-B 12240/1977 and JP-A 7332/1986. Needless-to-say, the PPS resin prepared in the manner as above for use in the invention may be processed in various methods. For example, it may be heated in air for crosslinking it and/or increasing its molecular weight; or may be heated in an inert gas atmosphere such as nitrogen or under reduced pressure; or may be washed with any of organic solvents, hot water or aqueous acid solutions; or may be activated with any of functional group-having compounds such as acid anhydrides, amines, isocyanates and functional group-having disulfide compounds.

One concrete method of heating the PPS resin for crosslinking it and/or increasing its molecular weight comprises heating it in an oxidizing gas atmosphere such as air or oxygen or in a mixed gas atmosphere comprising the oxidizing gas and an inert gas such as nitrogen or argon, in a container heated at a predetermined temperature so that its melt viscosity reaches the desired level. The temperature for the heat treatment generally falls between 170 and 280° C., but preferably between 200 and 270° C. The time for the heat treatment generally falls between 0.5 and 100 hours, but preferably between 2 and 50 hours. By controlling both the two, the melt viscosity of the resin can reach the desired level. The device for the heat treatment may be any ordinary hot air drier or may be a rotary heating device or a heating device equipped with a stirring blade. For efficiently and more uniformly heating the resin therein, preferred is a rotary heating device or a heating device equipped with a stirring blade.

One concrete method of heating the PPS resin in an inert gas atmosphere such as nitrogen or under reduced pressure comprises heating it in an inert gas atmosphere such as nitrogen or under reduced pressure, at a temperature falling between 150 and 280° C., preferably between 200 and 270° C., for a period of time falling between 0.5 and 100 hours, preferably between 2 and 50 hours. The device for the heat treatment may be any ordinary hot air drier or may be a rotary heating device or a heating device equipped with a stirring blade. For efficiently and more uniformly heating the resin therein, preferred is a rotary heating device or a heating device equipped with a stirring blade.

Preferably, the PPS resin for use in the invention is deionized. For deionizing it, concretely, the resin may be washed with any of aqueous acid solutions, hot water, or organic solvents. Two or more these treatments may be combined.

One concrete method of washing the PPS resin with an organic solvent is described. The organic solvent to be used for washing the resin is not specifically defined, and may be any and every one not having the function of decomposing the PPS resin. For example, it includes nitrogen-containing polar solvents such as N-methylpyrrolidone, dimethylformamide, dimethylacetamide; sulfoxide or sulfone solvents such as dimethyl sulfoxide, dimethyl sulfone; ketone solvents such as acetone, methyl ethyl ketone, diethyl ketone, acetophenone; ether solvents such as dimethyl ether, dipropyl ether, tetrahydrofuran; halogen-containing solvents such as chloroform, methylene chloride, trichloroethylene, dichloroethylene, dichloroethane, tetrachloroethane, chlorobenzene; alcohol or phenol solvents such as methanol, ethanol, propanol, butanol, pentanol, ethylene glycol, propylene glycol, phenol, cresol, polyethylene glycol; and aromatic hydrocarbon solvents such as benzene, toluene, xylene. Of those organic solvents, preferred are N-methylpyrrolidone, acetone, dimethylformamide, and chloroform. One or more such organic solvents may be used either singly or as combined. For washing the PPS resin with such an organic solvent, for example, the resin may be dipped in the solvent, optionally stirred or heated therein. The temperature at which the PPS resin is washed with such an organic solvent is not specifically defined, generally falling between room temperature and 300° C. or so. The washing efficiency is higher at a higher washing temperature, but, in general, temperatures falling between room temperature and 150° C. or so are enough for good washing results. After thus washed with such an organic solvent, the PPS resin is preferably washed a few times with water or warm water to remove the organic solvent remaining in the resin.

One concrete method of washing the PPS resin with hot water is described. For the desired chemical change in the PPS resin washed with hot water, the water to be used is preferably distilled water or deionized water. Concretely, in general, a predetermined amount of the PPS resin is put into a predetermined amount of water, and heated under normal pressure or in a pressure container with stirring. Regarding the ratio of the PPS resin to water, it is desirable that the amount of water is larger than that of the resin. In general, the bath ratio is so selected that at most 200 g of the PPS resin is put in one liter of water.

One concrete method of processing the PPS resin with acid is described. For example, the PPS resin is dipped in acid or an aqueous solution of acid, optionally stirred or heated. The acid to be used is not specifically defined, so far as it does not decompose the PPS resin. For example, it includes aliphatic saturated monocarboxylic acids such as formic acid, acetic acid, propionic acid, butyric acid; halo-substituted, aliphatic saturated carboxylic acids such as chloroacetic acid, dichloroacetic acid; aliphatic unsaturated monocarboxylic acids such as acrylic acid, crotonic acid; aromatic carboxylic acids such as benzoic acid, salicylic acid; dicarboxylic acids such as oxalic acid, malonic acid, succinic acid, phthalic acid, fumaric acid; inorganic acidic compounds such as sulfuric acid, phosphoric acid, hydrochloric acid, carbonic acid, silicic acid. Of those, preferred are acetic acid and hydrochloric acid. The acid-processed PPS resin is preferably washed a few times with water or warm water for removing the acid or salt remaining in the resin. The water to be used for the washing treatment is preferably distilled water or deionized water not interfering with the desirable chemical change in the acid-processed PPS resin.

The resin composition of the invention may additionally contain any known compatibilizer having the function of improving the miscibility of the polyolefin resin (a) and the PPS resin (b) that constitute the resin composition. Examples of the compatibilizer are organosilane compounds such as alkoxysilanes having at least one function group selected from an epoxy group, anamino group, an isocyanate group, a hydroxyl group, a mercapto group and an ureido group; modified polyolefins such as random, block or graft copolymers of α-olefins, e.g., ethylene or propylene, with at least one compound selected from α,β-unsaturated carboxylic acids, e.g., acrylic acid, methacrylic acid, maleic acid or crotonic acid, or their derivatives, e.g., esters, anhydrides, halides or salts with sodium, potassium, magnesium or zinc; and epoxy group-having olefin copolymers such as those comprising, as the essential ingredients, α-olefins and glycidyl esters of α,β-unsaturated acids, as well as other polyfunctional epoxy compounds. Two or more of these may be combined for use herein.

The thermoplastic resin structure of the invention is characterized by its partial or entire morphology of such that (1) a PPS resin component forms a continuous phase (matrix phase) and a polyolefin resin component forms a disperse phase (for example, like a sea-island configuration), or (2) a PPS resin component and a polyolefin resin component both form substantially continuous phases (for example, like a sea-sea configuration), or (3) the continuous phase is formed of a polyolefin resin component and the disperse phase is formed of a large number of thin, two-dimensional laminae (layers) of a PPS resin component (like a laminar configuration). The shape of the structure is not specifically defined. In different sites of the structure, the morphology (1), (2) or (3) may be present together, or may appear twice or more. The morphology (1), (2) or (3) can be seen and confirmed through scanning or transmission electronic microscopy.

The blend ratio of the polyolefin resin (a) and the PPS resin (b) that constitute the thermoplastic resin structure of the invention is described. In case where the PPS resin component forms a continuous phase (matrix phase) and the polyolefin resin component forms a disperse phase in the morphology of the structure (for example, like a sea-island configuration as in FIG. 1), the polyolefin resin accounts for from 5 to 80% by volume and the PPS resin for from 20to 95% by volume. Preferably, the polyolefin resin accounts for from 55 to 80% by volume and the PPS resin for from 20 to 45% by volume. In that case where the amount of the PPS resin component is small, the morphology in which the PPS resin forms a continuous phase can be formed, for example, by suitably controlling the melt viscosity ratio of polyolefin resin/PPS resin. The moldings having the morphology have a good balance of wet characteristics and transmission resistance and, when they are used for the barrier layer in multi-layer structures, they also have a good balance of toughness, interlayer adhesiveness, barrier properties and cost. Therefore, they are extremely favorable. More preferably, the blend ratio of the two components is such that the polyolefin resin accounts for from 60 to 75% by volume and the PPS resin for from 25 to 40% by volume. If the polyolefin resin component (a) is larger than 80% by volume, the PPS resin component could hardly form the continuous phase characteristic of the resin moldings of the invention, and the object of the invention cannot be attained. On the other hand, if the polyolefin resin component (a) is smaller than 5% by volume, it is unfavorable since the resin moldings could not be tough and the multi-layer structures could not have good interlayer adhesiveness.

Figure 2:
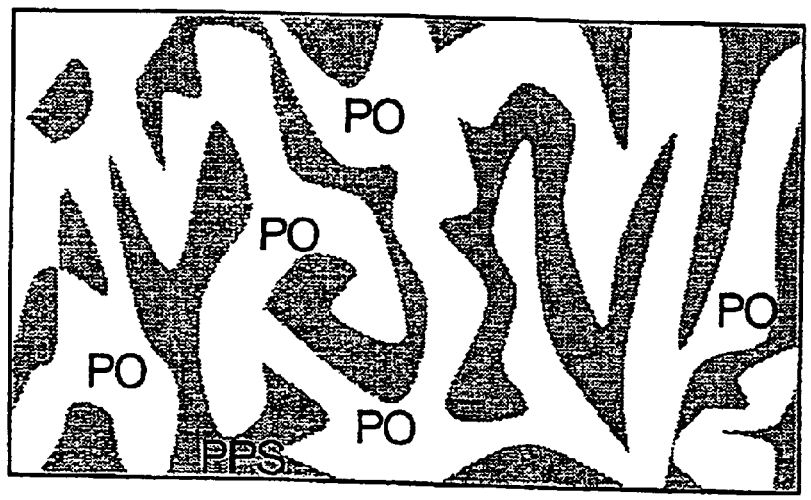
FIG. 2 shows a model of the morphology of a resin structure in which a PPS resin component and a polyolefin resin component both form substantially continuous phases.

In case where the PPS resin component and the polyolefin resin component both form substantially continuous phases (matrix phases) in the morphology of the resin structure (for example, like a sea-sea configuration as in FIG. 2), it is important that the melt viscosity and the compatibility of the polyolefin resin and the PPS resin are controlled within a composition range of such that the polyolefin resin accounts for from 15 to 85% by volume and the PPS resin for from 15 to 85% by volume. For embodying the separated morphology in that manner, the blend ratio of the two components is preferably such that the polyolefin resin accounts for from 30 to 70% by volume and the PPS resin for from 30 to 70% by volume, more preferably such that the polyolefin resin accounts for from 35 to 65% by volume and the PPS resin for from 35 to 65% by volume. If the polyolefin resin component (a) is larger than 85% by volume, the PPS resin component could hardly form a substantially continuous phase, and structures that attain the object of the invention could not be obtained.

Figure 3:
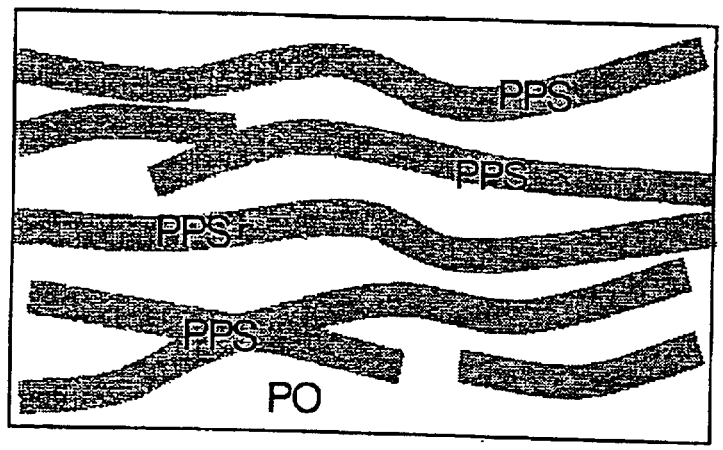
FIG. 3 shows a model of the morphology of a resin structure in which the continuous phase is formed of a polyolefin resin component and the disperse phase is formed of a large number of thin, two-dimensional laminae (layers) of a PPS resin component.

For forming the morphology in which the polyolefin resin component forms a continuous phase (matrix phase) and the PPS resin component forms a large number of thin, two-dimensional laminae (layers) of a disperse phase (a laminar structure as in FIG. 3), the polyolefin resin accounts for from 55 to 95% by volume and the PPS resin for from 5to 45% by volume. Preferably, the polyolefin resin accounts for from 60 to 90% by volume and the PPS resin for from 10 to 40% by volume; more preferably, the polyolefin resin accounts for from 65 to 85% by volume and the PPS resin for from 15 to 35% by volume. If the polyolefin resin component (a) is larger than 95% by volume, the laminar disperse phase of the PPS resin component could not be prolonged to have a desired length and a desired weight, and the object of the invention cannot be attained. If the polyolefin resin component (a) is smaller than 55% by volume, the PPS resin component could hardly form a laminar disperse phase.

L/T (length/thickness) of the PPS resin component that forms the laminar disperse phase is preferably at least 30. More preferably, L/T is at least 100, even more preferably at least 150. If L/T is smaller than 30, structures having the desired barrier properties could not be obtained. The uppermost limit of L/T is not specifically defined, but is preferably at most $1 \times 10^6$ in practical use.

The inorganic filler (c) usable in the invention is not specifically defined, and may be any fibrous, tabular, powdery or granular filler. Concretely, for example, it includes fibrous or whisker fillers such as glass fibers, PAN or pitch-type carbon fibers, metal fibers, e.g., stainless steel fibers, aluminium fibers or brass fibers, organic fibers, e.g., aromatic polyamide fibers, and gypsum fibers, ceramic fibers, asbestos fibers, zirconia fibers, alumina fibers, silica fibers, titanium oxide fibers, silicon carbide fibers, rock wool, potassium titanium whiskers, barium titanate whiskers, aluminium borate whiskers, silicon nitride whiskers; and powdery, granular or tabular fillers such as mica, talc, kaolin, silica, calcium carbonate, glass beads, glass flakes, glass microballoons, clay, molybdenum disulfide, wollastonite, titanium oxide, zinc oxide, calcium polyphosphate, graphite. Of those fillers, preferred are glass fibers, as well as PAN carbon fibers for electroconductive structures. The type of the glass fibers for use herein is not specifically defined, and may be any ones generally used for reinforcing resin. For example, they may be in any form of long fibers or short fibers of chopped strands or milled fibers. As combined, two or more different types of fillers mentioned above may be used herein. On its surface, the filler for use in the invention may be processed with a known coupling agent (e.g., silane coupling agent, titanate coupling agent), or with any other surface-treating agent. Glass fibers serving as the filler may be coated or bundled with thermoplastic resin such as ethylene/vinyl acetate copolymer or with thermosetting resin such as epoxy resin.

The filler content of the resin composition preferably falls between 0.5 and 200 parts by weight, more preferably between 5 and 200 parts by weight, even more preferably between 10 and 150 parts by weight relative to 100 parts by weight of the total of the polyolefin resin (a) and the PPS resin (b).

The multi-layer structure of the invention is formed by laminating different types of resin layers, in which at least one layer (hereinafter referred to as a barrier layer ($\alpha$)) is formed of the thermoplastic resin structure having the specific morphology as above, or a resin layer (hereinafter referred to as a neighboring layer ($\beta$)) differing from the barrier layer is formed on at least one surface of a layer of the thermoplastic resin structure of the invention having a different composition or morphology (this is also a barrier layer) or the barrier layer. In one preferred embodiment of the multi-layer structure of the invention, an adhesive, co-extrudable resin layer (hereinafter referred to as an adhesive layer ($\gamma$)) is suitably formed between the barrier layer ($\alpha$) and the neighboring layer ($\beta$) for enhancing the adhesiveness between the two layers. Concretely, for example, the layer configuration of the multi-layer structure of the type includes a two-resin two-layer configuration of layer ($\alpha$)/layer ($\beta$); a two-rein three-layer configuration of layer ($\beta$)/layer ($\alpha$)/layer ($\beta$); a three-resin three-layer configuration of layer ($\beta$)/layer ($\gamma$)/layer ($\alpha$); a three-resin four-layer configuration of layer ($\beta$)/layer ($\gamma$)/layer ($\alpha$)/layer ($\beta$); and a three-resin five-layer configuration of layer ($\beta$)/layer ($\gamma$)/layer ($\alpha$)/layer ($\gamma$)/layer ($\beta$), to which, however, the invention is not limited.

The resin to form the neighboring layer ($\beta$) in the multi-layer structure of the invention is a thermoplastic resin of which the morphology and the composition differ from the requirements in the invention. The type of the thermoplastic resin is not specifically defined, and may be any one selected in accordance with the use and the object of the multi-layer structure. Its examples are saturated polyester resins, polysulfone resins, polyethylene tetrafluoride resins, polyetherimide resins, polyamidimide resins, polyamide resins, polyimide resins, polycarbonate resins, polyether sulfone resins, polyether ketone resins, polythioether ketone resins, polyether-ether ketone resins, thermoplastic polyurethane resins, polyolefin resins, ABS resins, polyamide elastomers, and polyester elastomers. Two or more of these may be combined for use herein. Of those, especially preferred are polyolefin resins, thermoplastic polyester resins, polyamide resins, polycarbonate resins and ABS resins.

Preferred examples of the polyolefin resins may be the same as those of the component (a) mentioned hereinabove. Above all, especially preferred are low-, middle- and high-density polyethylene, polypropylene, ethylene/$\alpha$-olefin copolymer, poly-4-methylpentene-1, chloropolyethylene, and chloropolypropylene; and more preferred are ethylene homopolymer and/or ethylene/$\alpha$-olefin copolymer having a melt flow rate of from 0.01 to 30 g/10 min and a density of from 0.90 to 0.97 g/cm$^3$.

Preferred examples of the thermoplastic polyesters are those obtained from dicarboxylic acids such as terephthalic acid and aliphatic diols. The dicarboxylic acids except terephthalic acid for the polyesters are, for example, aliphatic dicarboxylic acids having from 2 to 20 carbon atoms, such as azelaic acid, sebacic acid, adipic acid, decanedicarboxylic acid; aromatic dicarboxylic acids such as isophthalic acid, naphthalenedicarboxylic acid; and alicyclic dicarboxylic acids such as cyclohexanedicarboxylic acid. One or more of these may be used either singly or as combined. The aliphatic diols include, for example, ethylene glycol, 1,2-propylene glycol, 1,3-propylene glycol, 1,4-butanediol, trimethylene glycol, 1,4-cyclohexanedimethanol, and hexamethylene glycol. Concretely, the polyesters are polyethylene terephthalate, polypropylene terephthalate, polybutylene terephthalate, polyhexamethylene terephthalate, polycyclohexylenedimethylene terephthalate, and polyethylene naphthalate. Of those, especially preferred for use herein are polybutylene terephthalate of good mechanical strength, and copolyesters that comprise a dicarboxylic acid component containing at least 60 mol %, preferably at least 70 mol % of terephthalic acid along with dodecanedicarboxylic acid and/or isophthalic acid, and a 1,4-butanedlol component.

The degree of polymerization of these thermoplastic polyester resins is not specifically defined. For example, polybutylene terephthalate and copolyesters that are preferred for use in the invention are preferably such that the intrinsic viscosity thereof measured in a 0.5% orthochlorophenol solution at 25° C. falls between 0.5 and 2.5, more preferably between 0.8 and 2.0. Polyethylene terephthalate for use herein is preferably such that its intrinsic viscosity measured in a 0.5% orthochlorophenol solution at 25° C. falls between 0.54 and 1.5, more preferably between 0.6 and 1.2.

The polyamide resins preferred for use herein are, for example, those comprising, as the essential constituent components, amino acid, lactamordiamine, and dicarboxylic acid. Examples of the essential constituent components are amino acids such as 6-aminocaproic acid, 11-aminoundecanoic acid, 12-aminododecanoic acid, para-aminomethylbenzoic acid; lactams such as $\epsilon$-caprolactam, $\omega$-laurolactam; aliphatic, alicyclic or aromatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, 5-methylnonamethylenediamine, metaxylylenediamine, paraxylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl) propane, bis(aminopropyl)piperazine, aminoethylpiperazine; and aliphatic, alicyclic or aromatic dicarboxylic acids such as adipic acid, suberic acid, azelaic acid, sebacic acid, dodecanedicarboxylic acid, terephthalic acid, isophthalic acid, 2-chloroterephthalic acid, 2-methylterephthalic acid, 5-methylisophthalic acid, 5-sodium-sulfoisophthalic acid, hexahydroterephthalic acid, hexahydroisophthalic acid. In the invention, nylon homopolymers or copolymers derived from these starting compounds may be used either singly or as combined.

Especially useful in the invention are heat-resistant and strong polyamide resins having a melting point of not lower than 150° C. Concretely, they include polycapramide (nylon 6), polyundecanamide (nylon 11), polydodecanamide (nylon 12), polyhexamethylenadipamide (nylon 66), polycapramide/polyhexamethylenadipamide copolymer (nylon 6/66), polytetramethylenadipamide (nylon 46), polyhexamethylenesebacamide (nylon 610), polyhexamethylenedodecamide (nylon 612), polyhexamethyleneterephthalamide/polycapramide copolymer (nylon 6T/6), polyhexamethylenadipamide/polyhexamethyleneterephthalamide copolymer (nylon 66/6T), polyhexamethylenadipamide/polyhexamethylenisophthalamide copolymer (nylon 66/6I), polyhexamethylenadipamide/polyhexamethyleneterephthalamide/polyhexamethylenisophthalamide copolymer (nylon 66/6T/6I), polyhexamethyleneterephthalamide/-polyhexamethylenisophthal amide copolymer (nylon 6T/6I), polyhexamethyleneterephthalamide/polydodecanamide copolymer (nylon 6T/12), polyhexamethyleneterephthalamide/poly(2-methylpentamethylene)terephthalamide copolymer (nylon 6T/M5T), polyxylylenadipamide (nylon XD6), polynonamethyleneterephthalamide (nylon 9T), and their mixtures and copolymers.

Especially preferred are copolymers having hexamethyleneterephthalamide units, such as nylon 6, nylon 66, nylon 12, nylon 11, nylon 6/66 copolymer, nylon 610, nylon 6T/66 copolymer, nylon 6T/6I copolymer, nylon 6T/6 copolymer. Also preferred in practical use are mixtures of these polyamide resins combined in accordance with the necessary properties such as moldability, heat resistance and barrier properties.

The degree of polymerization of the polyamide resins is not specifically defined. For example, preferred are those having a relative viscosity of from 2.0 to 7.0, more preferably from 2.5 to 6.0, measured in a 98% concentrated sulfuric acid solution having a sample concentration of 0.01 g/ml at 25° C.

The thermoplastic resins to form the neighboring layer (β) may contain, if desired, additives such as plasticizer, antioxidant, nucleating agent and colorant suitable to the respective resins.

The multi-layer structure of the invention, which has a barrier layer (α) formed of the thermoplastic resin structure having a separated morphology specifically defined in the invention, and a neighboring layer (β) formed on one or both surfaces of the barrier layer, can be produced, for example, in a two-layer injection molding method. However, the multi-layer structure in the form of a film or sheet may be produced in a coextrusion molding method that comprises melting the layer-forming compositions in separate extruders, feeding the melts into a multilayer-forming die and coextruding them through the die; or in a lamination molding method that comprises separately forming a layer to be the neighboring layer followed by melt-extruding a barrier layer thereon. The multi-layer structure for blow-molding containers such as bottles, barrels or tanks or for tabular articles such as pipes or tubes may be produced in an ordinary coextrusion molding method. For example, two-layered blow moldings of the multi-layer structure, of which the inner layer is a barrier layer having a specific morphology as herein and the outer layer is a neighboring layer, can be produced by separately feeding a resin composition for the barrier layer and a resin composition for the neighboring layer into the respective two extruders, then feeding the two resin melts into a die common thereto under pressure to form the respective circular flows integrated in such a manner that the flow for the barrier layer is inside and the flow for the neighboring layer is outside, then coextruding them out of the die, and working the resulting laminate in an ordinary known tube-forming or blow-molding method to give the intended two-layered blow moldings. Three-layered blow moldings of the multi-layer structure can be produced in the same manner as above, but using three extruders to form three-layered structures. For these, alternatively, usable are two extruders to form two-resin three-layered blow moldings. Of those methods, preferred is the coextrusion molding method as it ensures good interlayer adhesiveness of the multi-layer structures produced therein.

Preferably, the multi-layer structure of the invention has an adhesive layer (γ) suitably formed between the barrier layer (α) and the neighboring layer (β) for the purpose of further improving the impact resistance, the moldability and the interlayer adhesiveness thereof. The resin to form the adhesive layer is not specifically defined in point of its configuration, so far as it is adhesive to both the barrier layer (α) and the neighboring layer (β) and it is coextrudable with the two layers. Concretely, examples of the resin are modified polyolefins such as random, block or graft copolymers comprising an α-olefin, e.g., ethylene or propylene, and at least one compound selected from α,β-unsaturated carboxylic acids such as acrylic acid, methacrylic acid, maleic acid and crotonic acid, and their derivatives such as esters, anhydrides, halides and salts with sodium, potassium, magnesium or zinc; random, block or graft copolymers comprising an α-olefin such as ethylene or propylene, and at least one compound selected from vinyl acetate, vinyl alcohol and styrenes; copolyamide adhesives and copolyester adhesives. Of those for the adhesive layer, preferred are modified polyolefins having a degree of crystallinity, measured through X-ray diffractiometry, of at most 50%, preferably at most 40% and containing from 0.01 to 10% by weight, preferably from 0.05 to 3% by weight of an unsaturated carboxylic acid or its derivative grafted thereon. The adhesive layer of the modified polyolefin that contains an unsaturated carboxylic acid or its derivative within the defined range and has a degree of crystallinity falling within the defined range is highly adhesive to the barrier layer in the multi-layer structure. The compounds mentioned hereinabove for the modifying agent for the polyolefin component (a) are preferred for the unsaturated carboxylic acid and its derivative for the modified polyolefins. Especially preferred are unsaturated dicarboxylic acids such as acrylic acid, methacrylic acid; dicarboxylic acid anhydrides such as maleic anhydride, itaconic anhydride; and glycidyl esters of unsaturated carboxylic acids such as glycidyl acrylate, glycidyl methacrylate.

One or more such modified polyolefins may be used for the adhesive layer, either singly or as combined. The modified polyolefin mixtures shall have the degree of crystallinity and the degree of grafting each falling within the defined range. The mixtures may contain any other graft-modified polyolefins of which the degree of crystallinity and/or the degree of grafting overstep the range, and/or polyolefins not grafted and modified.

Preferred examples of the polyolefins before grafted and modified and those not grafted and modified are homopolymers of α-olefins having from 2 to 20 carbon atoms, and copolymers of two or more different types of such α-olefins. The α-olefins include, for example, ethylene, propylene, 1-butene, 1-hexene, 4-methyl-1-pentene, 1-octene, 1-decene, 1-tetradecene and 1-octadecene. The polyolefins may be copolymerized with minor, for example, at most 10 mol % of any other monomers except α-olefins.

For the polyolefins, especially preferred are ethylene homopolymers and ethylene-α-olefin random copolymers. Concretely, they are linear low-density polyethylene (L-LDPE), ethylene-propylenecopolymers, and ethylene-butene copolymers. Of those, more preferred are the ethylene copolymers having an MFR of from 0.1 to 50 g/10 min, preferably from 0.2 to 20 g/10 min, a density of from 0.850 to 0.940 g/cm$^3$, preferably from 0.855 to 0.920 g/cm$^3$, an ethylene content of from 30 to 95 mol %, preferably from 40 to 92 mol %, and a degree of crystallinity measured through X-ray diffractiometry of at most 50%, preferably at most 40%.

The modified polyolefins for the adhesive layer may contain a tackifier. Concretely, the tackifier includes, for example, aliphatic hydrocarbon resins, alicyclic hydrocarbon resins prepared by hydrogenating aromatic hydrocarbon resins, as well as α-pinene resins, terpene resins, rosin, modified rosins, and their mixtures. The tackifying resins are solid amorphous polymers heretofore used for tackifiers and adhesives in the field of adhesive tapes, coating compositions and hot-melt adhesives. Of those, especially preferred for use herein are alicyclic hydrocarbons having a softening point (in ring and ball method) of from 105 to 150° C. preferably from 110 to 140° C., and having a degree of hydrogenation of aromatic nuclei of at least 80%, preferably at least 85%. Commercially-available tackifiers are also usable herein. For example, mentioned is Arakawa Chemical Industry's Arkon P-125.

The blend ratio of the modified polyolefin and the tackifier may be such that the modified polyolefin accounts for from 60 to 99% by weight, preferably from 80 to 95% by weight, and the tackifier accounts for from 1 to 40% by weight, preferably from 5 to 20% by weight.

For making it electroconductive, the thermoplastic resin structure of the invention may contain an electroconductive filler and/or an electroconductive polymer. The additives are not specifically defined. For example, the electroconductive filler may be any and every one generally used in ordinary resins for making them electroconductive. Its examples are metal powders, metal flakes, metal ribbons, metal fibers, metal oxides, electroconductive substance-coated inorganic fillers, carbon powder, graphite, carbon fibers, carbon flakes, and scalycarbon.

Examples of the metal for the metal powders, metal flakes and metal ribbons are silver, nickel, copper, zinc, aluminium, stainless steel, iron, brass, chromium, and tin.

Examples of the metal for the metal fibers are iron, copper, stainless steel, aluminium, and brass.

The metal powders, metal flakes, metal ribbons and metal fibers may be processed on their surfaces with a surface-treating agent such as titanate-type, aluminium-type or silane-type agents.

Examples of the metal oxides are (antimony-doped) SnO$_2$, (antimony-doped) In$_2$O$_3$, and (aluminium-doped) ZnO. These may be processed on their surfaces with a surface-treating agent such as titanate, aluminium or silane coupling agents.

Examples of the electroconductive substance for the electroconductive substance-coated inorganic fillers are aluminium, nickel, silver, carbon, (antimony-doped) SnO$_2$, and (antimony-doped) In$_2$O$_3$. Examples of the inorganic fillers to be coated with it are mica, glass beads, glass fibers, carbon fibers, potassium titanate whiskers, barium sulfate, zinc oxide, titanium oxide, aluminium borate whiskers, zinc oxide whiskers, titanium oxide whiskers, and silicon carbide whiskers. For coating them, for example, employable are various methods of vacuum vapor deposition, sputtering, electroless plating or baking. The inorganic fillers may be processed on their surfaces with a surface-treating agent such as titanate, aluminium or silane coupling agents.

Grouped from its starting materials and production methods, carbon powder includes, for example, acetylene black, gas black, oil black, naphthalene black, thermal black, furnace black, lamp black, channel black, roll black, and disc black. The carbon powder for use in the invention is not specifically defined in point of its starting materials and production methods. For it, however, especially preferred are acetylene black and furnace black. Produced are various types of carbon powder that differ in their characteristic parameters such as particle size, surface area, DBP oil absorption and ash content. The carbon powder for use in the invention is not specifically defined in point of its characteristic parameters. However, for good balance of strength and electroconductivity thereof, the carbon powder for use herein preferably has a mean particle size of at most 500 nm, more preferably falling between 5 and 100 nm, even more preferably between 10 and 70 nm. The specific surface area (in BET method) of the carbon powder is preferably at least 10 m$^2$/g, more preferably at least 30 m$^2$/g. The DBP oil absorption thereof is preferably at least 50 ml/100 g, more preferably at least 100 ml/100 g. The ash content thereof is preferably at most 0.5% by weight, more preferably at most 0.3% by weight.

The carbon particles may be processed on their surfaces with a surface-treating agent such as titanate-type, aluminium-type or silane-type agents. For better processability in melt kneading, the carbon powder may be formed into granules.

The moldings obtained by fabricating the thermoplastic resin structure of the invention are often desired to have good surface smoothness. From this viewpoint, desired for the electroconductive fillers for use in the invention are powdery, granular, tabular or flaky matters as well as fibrous matters that have a ratio of length/diameter of at most 200 in the resin composition, rather than fibrous fillers having a high aspect ratio, like those for the inorganic filler (c) used in the invention.

Examples of the electroconductive polymer are polyaniline, polypyrrole, polyacetylene, poly(paraphenylene), polythiophene, and polyphenylenevinylene.

Two or more different matters of the electroconductive filler and/or the electroconductive polymer may be used herein, as combined. Of those electroconductive fillers and electroconductive polymers, especially preferred is carbon black as it is strong and inexpensive.

The content of the electroconductive filler and/or the electroconductive polymer that may be in the resin structure of the invention varies, depending on the type of the electroconductive filler and/or the electroconductive polymer to be used, and therefore could not be indiscriminately defined. However, from the viewpoint of the balance of the electroconductivity, the flowability and the mechanical strength of the resin composition, it is desirable that the filler content of the resin composition falls between 1 and 250 parts by weight, more preferably between 3 and 100 parts by weight relative to 100 parts by weight of the total of the components (a), (b) and (c). Also more preferably, the filler content falls between 3 and 100 parts by weight relative to 100 parts by weight of the total of the components (a) and (b) for well making the resin structure electroconductive.

Preferably, the electroconductive resin structure has a volume resistivity of at most $10^{10}$ Ω·cm in order that it is resistant to static electrification. However, the electroconductive filler and the electroconductive polymer, if any in the resin composition, will often worsen the flowability of the composition and the strength of the resin structure. Therefore, so far as the intended electroconductive level is attained, the amount of the electroconductive filler and the electroconductive polymer to be in the resin composition is as small as possible. The intended electroconductive level varies, depending on the use of the resin structure. In general, the volume resistivity of the resin structure shall be larger than 100 Ω·cm but not larger than $10^{10}$ Ω·cm.

The resin composition of the invention may contain any other components not detracting from the effect of the invention. For example, it may contain any of antioxidants and heat-resistant stabilizers (e.g., hindered phenols, hydroquinones, phosphates and their substituted derivatives), weatherproofing agents (e.g., resorcinols, salicylates, benzotriazoles, benzophenones, hindered amines), mold release agents and lubricants (e.g., montanic acid and its metal salts, esters and half esters; stearyl alcohol, stearamide, various bisamides, bisureas, polyethylene wax), pigments (e.g., cadmium sulfide, phthalocyanine, carbon black), dyes (e.g., nigrosine), nucleating agents (e.g., talc, silica, kaolin, clay), plasticizers (e.g., octyl p-hydroxybenzoate, N-butylbenzenesulfonamide), antistatic agents (e.g., alkylsulfate-type anionic antistatic agents, quaternary ammonium-type cationic antistatic agents, nonionic antistatic agents such as polyoxyethylene sorbitan monostearate, betaine-type ampholytic antistatic agents), flame retardants (e.g., red phosphorus, melamine cyanurate, hydroxides such as magnesium hydroxide and aluminium hydroxide, ammonium polyphosphate, polystyrene bromide, polyphenylene ether bromide, polycarbonate bromide, epoxy bromide resin, and combinations of such a bromine-containing flame retardant and antimony trioxide), and other polymers.

The method for producing the resin structure of the invention is not specifically defined, so far as the resin structure produced can have the morphology that satisfies the requirement of the invention. For realizing the preferred morphology, for example, the polyolefin resin and the PPS resin to form the resin structure are fed into separate two extruders through the respective main feeders and an inorganic filler is added thereto through a side feeder disposed at the top of each extruder; or the polyolefin resin and the PPS resin are first kneaded in melt, and an inorganic filler is added to the mixed resin melt.

The thermoplastic resin structure and the multi-layer structure of the invention may be shaped in any known manner, and the method of molding them is not specifically defined, for which, for example, employable is injection molding, extrusion molding, blow molding or press molding. Especially preferred for molding them is at least one method selected from injection molding, injection compression molding and compression molding for enhancing the productivity and the industrial application of the invention. The molding temperature may fall generally within a range higher than the melting point of the PPS resin by from 5 to 50° C. In general, the moldings are single-layered, but may be multi-layered in a two-layer molding method.

The layer configuration in the multi-layer structure of the invention is not specifically defined. All the layers of the multi-layer structure may be formed of the thermoplastic resin structure of the invention, or any other thermoplastic resin may be used for some layers. In two-layered multi-layer structures, the layer of the thermoplastic resin structure of the invention is preferably the innermost layer in order that it can fully exhibit its transmission-resistant effect. The moldings obtained herein may be integrated together or with other moldings by the use of an adhesive or through hot-sealing, and the method of integrating them is not specifically defined, for which are employable any known techniques.

As the thermoplastic resin structure and the multi-layer structure of the invention have good gas barrier properties, and are durable and easy to work, they are favorable for containers for transportation and/or storage of liquid chemicals and gases, for the attached parts of such containers, and also for multi-layered tubes or multi-layered blow moldings to be formed through coextrusion. Regarding the liquid chemicals and the gases, the resin structure and the multi-layer structure are highly resistant to transmission therethrough of vapors and/or liquids and also evaporated gases, for example, Flon-11, Flon-12, Flon-21, Flon-22, Flon-113, Flon-114, Flon-115, Flon-134a, Flon-32, Flon-123, Flon-124, Flon-125, Flon-143a, Flon-141b, Flon-142b, Flon-225, Flon-C318, R-502, 1,1,1-trichloroethane, methyl chloride, methylene chloride, ethyl chloride, methylchloroform, propane, isobutane, n-butane, dimethyl ether, castor oil-based brake fluid, glycol ether-based brake fluid, borate-based brake fluid, brake fluid for use in extremely cold regions, silicone oil-based brake fluid, mineral oil-based brake fluid, power steering oil, windshield wash, gasoline, methanol, ethanol, isobutanol, butanol, nitrogen, oxygen, hydrogen, carbon dioxide, methane, propane, natural gas, argon, helium, xenon and medicines. Therefore, the resin structure and the multi-layer structure have many applications for parts of electric and electronic appliances, medical appliances, food-related appliances, household and office-use appliances, constructions-related parts, furniture parts and others. For example, their applications are for films of transmission resistance against vapors and/or liquids mentioned above; as well as for tanks and bottles for automobile parts, parts for medical appliances and daily commodities, such as air bags, bottles for liquid chemicals such as shampoo, rinse, liquid soap, detergent, tanks for storage of liquid chemicals, tanks for storage of gases, coolant tanks, oil transportation tanks, disinfectant tanks, tanks for blood transfusion pumps, fuel tanks, windshield wash tanks, oil reservoir tanks, canisters; Attached parts for such tanks and bottles, such as valves, e.g., cutoff valves, joints, gauges for attendant pumps, cases and other parts, various fuel tubes and connecting parts (e.g., connectors), e.g., fuel filler under-pipes, ORVR hoses, reserve hoses, bent hoses, oil tubes and connecting parts, brake hoses and connecting parts, windshield wash nozzles and hoses, cooler hoses and connecting parts for cooling water and coolant, tubes and connecting parts for coolant for air conditioners, floor-warming pipes and connecting parts, fire extinguishers and fire hoses, tubes, connecting parts and valves for medical cooling devices, tubes for transportation of liquid chemicals and gases, containers for storage of liquid chemicals, and other applications requiring liquid chemical and vapor transmission resistance; and machine parts such as automobile parts, internal combustion engine parts, and housings for electric tools.

EXAMPLES

The invention is described in detail hereinunder with reference to Examples. However, the scope of the invention is not limited to only the following Examples.

(1) Alcohol Gasoline Transmission:

Using a 40 mmϕ extruder with a tubular die, a sizing die to cool the tube extruded out of the extruder and to control the size of the tube and a take-up unit disposed at its top, a tube having an outer diameter of 8 mm and an inner diameter of 6 mm was molded. The tube was cut into a length of 20 cm. One end of the sample was sealed up, just 6 g of an alcohol gasoline mixture of commercially-available regular gasoline/ethanol of 75/25 by weight was put into it, and the other end thereof was sealed up. With that, the overall weight of the sample was measured. The sample was put into an explosion-proof oven at 60° C., and kept therein for 500 hours, and its weight loss was measured.

(2) Oxygen Transmission:

Measured according to JIS K7126, method A (differential pressure method), for which used was GTR-10 (by Yanako Bunseki Kogyo).

(3) Mechanical Strength:

Measured according to standard methods mentioned below. Tensile strength: ASTM D638 Flexural modulus: ASTM D790 Izod impact strength: ASTM D256

(4) Analysis of Separated Morphology:

The cross section (barrier layer) of the molded tube was analyzed with electronic microscopes (TEM, SEM).

(5) Physical Properties of Multi-layer Structure:

(A) Gasohol Barrier Properties:

The tube was cut into a length of 30 cm. One end of the sample was sealed up, an alcohol gasoline mixture of commercially-available regular gasoline/methyl alcohol of 85/15 (by weight) was put into it, and the other end thereof was sealed up. With that, the overall weight of the sample was measured. The sample was put into an explosion-proof oven at 40° C. From the weight change of the sample, the alcohol gasoline transmission through the tube was determined.

(B) Interlayer Adhesion Strength:

The tube was cut and opened into a rectangular strip having a width of 10 mm, and the inner and outer layers with an adhesive layer therebetween (the adhesive layer was stuck to the neighboring layer of a thermoplastic resin composition) were peeled away by pulling them in the opposite directions at 180 degrees, whereupon the adhesion strength per the unit length of the sample was measured.

[Reference Example 1 (Preparation of PPS Copolymer)]

3.26 kg of sodium sulfide (25 mols, containing 40% crystal water), 4 g of sodium hydroxide, 1.36 kg of sodium acetate trihydrate (about 10 mols), and 7.9 kg of N-methylpyrrolidone were fed into an autoclave equipped with a stirrer, and gradually heated up to 205° C. with stirring, and about 1.5 liters of distillate containing 1.36 kg of water was removed. To the residual mixture, added were 3.38 kg of 1,4-dichlorobenzene (23.0 mols), 0.37 kg of 1,3-dichlorobenzene (2.5 mols), and 2 kg of NMP, and heated at 265° C. for 5 hours. The reaction product was washed three times with hot water at 70° C., then with aqueous acetic acid solution with pH=4 at 60° C., and further four times with hot water at 70° C., and then dried under reduced pressure at 80° C. for 24 hours to obtain about 2 kg of a PPS copolymer resin having a melting point of 255° C. and MFR of 800 g/10 min (at 315° C. under 5000 g).

The polyolefin resins and PPS used in Examples and Comparative Examples are mentioned below. Unless otherwise specifically indicated, they were prepared through ordinary polymerization.

<Polyolefin Resins>

(PO-1): high-density polyethylene having MFR of 14 and density of 0.96.

(PO-2): high-density polyethylene having MFR of 32 and density of 0.96.

(PO-3): polypropylene having MFR of 10 and density of 0.89.

(PO-4): high-density polyethylene having MFR of 0.3 and density of 0.95.

(PO-5): high-density polyethylene having MFR of 6.0 and density of 0.96.

(PO-6): low-density polyethylene having MFR of 1.0 and density of 0.92.

(PO-7): polypropylene having MFR of 0.5 and density of 0.89.

(PO-8): ethylene-ethyl acrylate copolymer having MFR of 1.5 and density of 0.93.

(PO-9): ethylene-propylene copolymer having MFR of 0.6 and density of 0.88.

<PPS Resins>

(PPS-1): PPS resin having melting point of 280° C., MFR of 1000 g/10 min (at 315° C. under 5000 g) and weight-average molecular weight (Mw) of 30000.

(PPS-2): PPS resin having melting point of 280° C., MFR of 300 g/10 min, Mw of 49000 and viscosity of 700 poises.

(PPS-3): PPS resin having melting point of 280° C., MFR of 100 g/10 min, Mw of 70000 and viscosity of 1700 poises.

(PPS-4): PPS resin having melting point of 280° C., MFR of 600 g/10 min, Mw of 38000 and viscosity of 450 poises.

(PPS-5): PPS copolymer resin prepared in Reference Example 1, having melting point of 255° C. and MFR of 800 g/10 min.

<Thermoplastic Resins Except Resin Compositions to Form Barrier Layer (These are for Neighboring Layer)>

($\beta$-1): high-density polyethylene having MPR of 0.3 g/10 min and density of 0.94.

($\beta$-2): polybutylene terephthalate (Toray's LUMI CON 5201×11).

($\beta$-3): nylon 11 (Toray's RILSAN BESN O P40TL).

($\beta$-4): ethylene-1-hexene copolymer having MFR of 4 g/10 min and density of 0.92.

<Resins for Adhesive Layer>

($\gamma$-1): ethylene/glycidyl methacrylate (90/10 wt %) copolymer.

($\gamma$-2): ethylene/methyl acrylate/glycidyl methacrylate (64/30/6 wt. %) copolymer.

($\gamma$-3): maleic anhydride-modified ethylene/1-butene copolymer (having density of 0.88, degree of crystallinity of 15%, and degree of grafting with maleic anhydride of 0.4% by weight).

($\gamma$-4): maleic anhydride-modified ethylene/1-octene copolymer (having density of 0.86, degree of crystallinity of 5% or less, and degree of grafting with maleic anhydride of 0.8% by weight).

($\gamma$-5): adhesive composition prepared by mixing maleic anhydride-modified ethylene/1-butene copolymer (having density of 0.88, degree of crystallinity of 15%, and degree of grafting with maleic anhydride of 0.4% by weight), maleic anhydride-modified polyethylene (having density of 0.96 and degree of grafting with maleic anhydride of 2.0% by weight), and tackifier (Arakawa Chemical Industry's Arkon P-125) were mixed in a ratio of 85/5/10 parts by weight, followed by kneading the mixture in melt in a double-screw extruder at a cylinder temperature of 200° C.

Examples 1 to 15, Comparative Examples 1 to 4:

As in Tables 1 and 2, the mixture previously prepared by melting and kneading the PPS resin and a compatibilizer (ethylene/glycidyl methacrylate copolymer, 90/10% by weight), and the polyolefin resin were fed into a double-screw extruder, Nippon Seikosho's TEX 30 Model through its main feeder. The inorganic filler, if used, was fed thereinto through a side feeder provided at some part of the cylinder. These were kneaded in melt in the extruder at 300°

Figure 4:
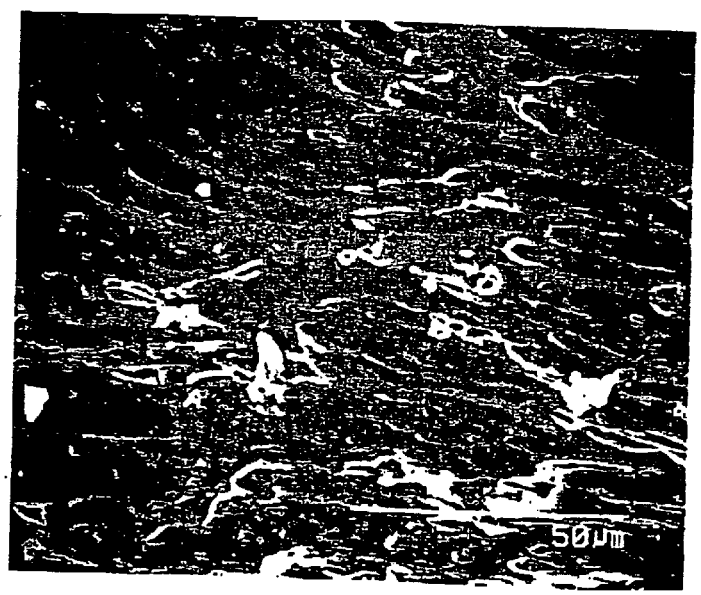
FIG. 4 is an electronmicroscopic picture showing the morphology of the resin structure obtained in Example 8, in which the dark part is formed of a polyolefin resin component.
Figure 5:
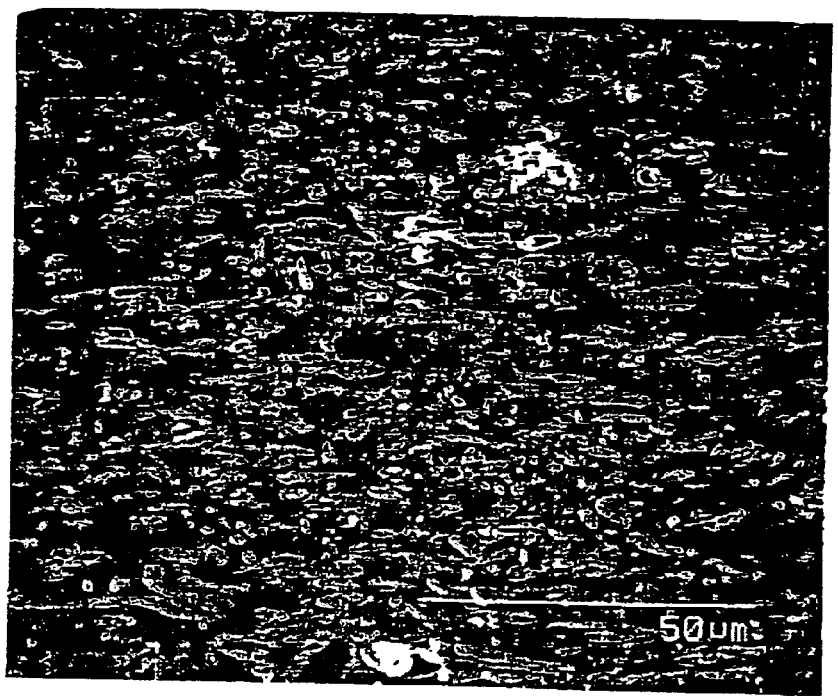
FIG. 5 is an electronmicroscopic picture showing the morphology of the resin structure obtained in Comparative Example 1, in which the dark part is formed of a polyolefin resin component.

C., for which the screw revolution was 200 rpm. The resulting pellets were dried, and then injection-molded into test pieces. The injection-molding machine used was Toshiba Kikai's IS100FA, and the mold temperature was 80° C. In addition, the pellets prepared in the same manner as above were molded into tubes for the test for alcohol gasoline transmission through them. The data of the transmission resistance and the mechanical strength of the samples are given in Tables 1 and 2. Some samples were analyzed for the separated morphology therein. FIG. 4 is the electronmicroscopic picture of the sample of Example 8; and FIG. 5 is the electronmicroscopic picture of the sample of Comparative Example 2.

In the tables, GF is glass fibers (of 3 mm chopped strands diameter of 10 μm, by Nippon Electric Glass): MF is milled fibers (having a mean fiber length of 140 μm and a mean fiber diameter of 9 μm, by Nippon Electric Glass).

TABLE 1

| | Item | Unit | Ex. 1 | Ex. 2 | Ex. 3 | Ex. 4 | Ex. 5 | Ex. 6 | Ex. 7 | Ex. 8 | Co. Ex. 1 | Co. Ex. 2 |
|---|---|---|---|---|---|---|---|---|---|---|---|---|
| Constituent Components | Type of polyolefin resin | — | PO-1 | PO-2 | PO-1 | PO-3 | PO-1 | PO-1 | PO-4 | PO-4 | PO-1 | PO-2 |
| | amount | vol. % | 67 | 56 | 78 | 62 | 67 | 34 | 57 | 69 | 100 | 67 |
| | Type of PPS resin | — | PPS-2 | PPS-1 | PPS-1 | PPS-1 | PPS-1 | PPS-2 | PPS-1 | PPS-2 | — | PPS-3 |
| | amount | vol. % | 30 | 40 | 20 | 35 | 30 | 60 | 40 | 30 | | 30 |
| | Compatibilizer | vol. % | 3 | 4 | 2 | 3 | 3 | 6 | 3 | 1 | — | 3 |
| Separated Morphology | | continuous phase matrix | PPS | PPS and polyolefin | polyolefin | PPS matrix | PPS and polyolefin | PPS and polyolefin | polyolefin | polyolefin | polyolefin | polyolefin |
| | | disperse phase | polyolefin | — | PPS laminar dispersion | polyolefin | — | — | PPS laminar dispersion | PPS laminar dispersion | — | PPS spherical dispersion |
| Transmission Resistance | alcohol gasoline transmission | g | 0.5 | 0.7 | 0.8 | 0.6 | 0.6 | 0.4 | 0.5 | 0.7 | 3.3 | 2.8 |
| | oxygen transmission | note 1 | 40 | 60 | 80 | 40 | 50 | 15 | 50 | 90 | 10000 | 9000 |
| Mechanical Strength | tensile strength | MPa | 45 | 55 | 40 | 60 | 45 | 70 | 40 | 35 | 30 | 35 |
| | flexural modulus | GPa | 2.2 | 2.5 | 2.0 | 2.6 | 2.0 | 2.7 | 2.0 | 1.7 | 1.0 | 1.5 |
| | Izod impact strength | J/m | 50 | 56 | 44 | 42 | 45 | 40 | 50 | 46 | 30 | 28 | note 1) The unit of oxygen transmission is cc · 25 μ/m² 24 hr · atm, 25° C.
(PO-1): high-density polyethylene with MFR 14 and density 0.96.
(PO-2): high-density polyethylene with MFR 32 and density 0.96.
(PO-3): polypropylene with MFR 10 and density 0.89.
(PO-4): high-density polyethylene with MFR 0.3 and density 0.95.
(PPS-1): PPS resin with m.p. 280° C., MFR 1000 g/10 min, and Mw 30000.
(PPS-2): PPS resin with m.p. 280° C., MFR 300 g/10 min, and Mw 49000.
(PPS-3): PPS resin with m.p. 280° C., MFR 100 g/10 min, and Mw 70000.

TABLE 2

| | Item | Unit | Ex. 9 | Ex. 10 | Ex. 11 | Ex. 12 | Ex. 13 | Ex. 14 | Ex. 15 | Co. Ex. 3 | Co. Ex. 4 |
|---|---|---|---|---|---|---|---|---|---|---|---|
| Constituent Components | Type of polyolefin resin | — | PO-1 | PO-2 | PO-1 | PO-3 | PO-1 | PO-1 | PO-4 | PO-1 | PO-2 |
| | amount | vol. % | 67 | 56 | 78 | 62 | 67 | 34 | 58 | 100 | 67 |
| | Type of PPS resin | — | PPS-2 | PPS-1 | PPS-1 | PPS-1 | PPS-1 | PPS-2 | PPS-2 | — | PPS-3 |
| | amount | vol. % | 30 | 40 | 20 | 35 | 30 | 60 | 40 | | 30 |
| | Compatibilizer | vol. % | 3 | 4 | 2 | 3 | 3 | 6 | 2 | — | 3 |
| | Type of inorganic filler | — | GF | GF | GF | GF/talc | GF/MF | GF | GF | GF | GF |
| | amount | wt. % | 40 | 40 | 40 | 35/5 | 30/10 | 40 | 40 | 40 | 40 |
| Separated Morphology | | continuous phase matrix | PPS | PPS and polyolefin | polyolefin | PPS | PPS and polyolefin | PPS and polyolefin | polyolefin | polyolefin | polyolefin |
| | | disperse phase | polyolefin | — | PPS laminar dispersion | polyolefin | — | — | PPS laminar dispersion | — | PPS spherical dispersion |
| Transmission Resistance | alcohol gasoline transmission | g | 0.4 | 0.6 | 0.7 | 0.5 | 0.6 | 0.3 | 0.6 | 3.2 | 2.5 |
| | oxygen transmission | note 1 | 40 | 60 | 70 | 40 | 50 | 10 | 60 | 10000 | 9000 |
| Mechanical Strength | tensile strength | MPa | 110 | 110 | 100 | 95 | 90 | 115 | 100 | 100 | 110 |
| | flexural modulus | GPa | 6.3 | 7.0 | 6.1 | 5.5 | 5.2 | 7.8 | 7.3 | 5.4 | 6.0 |
| | Izod impact strength | J/m | 90 | 100 | 95 | 90 | 85 | 100 | 100 | 90 | 80 | note 1) The unit of oxygen transmission is cc · 25 μ/m² 24 hr · atm, 25° C.
(PO-1): high-density polyethylene with MFR 14 and density 0.96.
(PO-2): high-density polyethylene with MFR 32 and density 0.96.
(PO-3): polypropylene with MFR 10 and density 0.89.
(PO-4): high-density polyethylene with MFR 0.3 and density 0.95.
(PPS-1): PPS resin with m.p. 280° C., MFR 1000 g/10 min, and Mw 30000.

TABLE 2-continued (PPS-2): PPS resin with m.p. 280° C., MFR 300 g/10 min, and Mw 49000.
(PPS-3): PPS resin with m.p. 280° C., MFR 100 g/10 min, and Mw 70000.

As in Examples 1 to 15 and Comparative Examples 1 to 4, the resin moldings of the invention having a specific, separated morphology as defined herein have good transmission resistance and confirmed the practical applicability of the resin structure of the invention. In addition, the test pieces formed through injection moldings also have good transmission resistance and confirmed the practical applicability of the resin structure of the invention.

Examples 16 to 32, Comparative Examples 5 to 8:

As in Tables 3 to 5, the PPS resin was mixed with a compatibilizer (ethylene/glycidyl methacrylate copolymer, 90/10% by weight), the resulting mixture was fed into a double-screw extruder, Nippon Seikosho's TEX 30 Model through its main feeder with the polyolefin resin being thereinto through a side feeder provided at some part of the cylinder, and these were kneaded in melt at 270 to 300° C., for which the screw revolution was 200 μm. The resulting pellets were dried, and then molded into tubes.

In that manner, molded were three-resin three-layer tubes composed of one barrier layer (α), one neighboring layer (β) of thermoplastic resin, and one adhesive layer (γ) between the barrier layer and the neighboring layer (or two-resin two-layer tubes not having the adhesive layer). For these, the molding machine used has three extruders, a forming die, a sizing die and a take-up unit, in which the resin melts extruded out of the three extruders are collected in an adapter and molded into a tube through the forming die, and the tube is cooled and its size is controlled by the sizing die.

The three-layer tubes obtained herein had an outer diameter of 8 mm and an inner diameter of 6 mm, in which the thickness of the outer (thermoplastic resin layer) was 0.70 mm (in the two-layer tubes, however, this was 0.80 mm), that of the adhesive layer was 0.10 mm and that of the inner layer (barrier layer) was 0.20 mm. The multi-layer tubes were tested, and the test results are given in Tables 3, 4 and 5.

TABLE 3

| | Item | Unit | Ex. 16 | Ex. 17 | Ex. 18 | Co. Ex. 5 | Co. Ex. 6 | Co. Ex. 7 | Co. Ex. 8 |
|---|---|---|---|---|---|---|---|---|---|
| Constituent Components of Barrier Layer (α) | Type of polyolefin resin (a) | — | PO-4 | PO-5 | PO-5 | — | PO-5 | PO-5 | PO-4 |
| | Amount of polyolefin resin | vol. % | 65 | 50 | 77 | — | 70 | 70 | 100 |
| | Type of PPS resin (b) | — | PPS-4 | PPS-4 | PPS-3 | PPS-3 | PPS-3 | PPS-3 | — |
| | Amount of PPS resin | vol. % | 30 | 45 | 20 | 100 | 25 | 25 | — |
| | Compatibilizer | vol. % | 5 | 5 | 3 | — | 5 | 5 | — |
| Layer (β) | Thermoplastic resin layer (neighboring layer) | | β-1 | β-1 | β-1 | β-1 | β-1 | β-1 | β-1 |
| Layer (γ) | Adhesive layer | | γ-1 | γ-1 | γ-1 | γ-1 | γ-1 | — | γ-1 |
| Separated Morphology of Barrier Layer | | continuous phase | PPS | PPS and polyolefin | PPS laminar dispersion | PPS | polyolefin | polyolefin | polyolefin |
| | | disperse phase | polyolefin | — | PPS laminar dispersion | — | PPS spherical dispersion | PPS spherical dispersion | — |
| Gasohol Barrier Properties | gasohol transmission (g · mm/m² · 24 h · atm) | | 0.67 | 0.75 | 0.89 | 0.24 | 10 or more | 10 or more | 10 or more |
| Interlayer Adhesion Strength of Moldings (kg/10 mm) | | | 3.1 | 3.5 | 4.2 | 0.5 or less | not peeled | 2.2 | not peeled |

<Polyolefin resin>
(PO-4): high-density polyethylene with MFR 0.3 and density 0.95.
(PO-5): high-density polyethylene with MFR 6.0 and density 0.96.
<PPS resin>
(PPS-3): PPS resin with m.p. 280° C., MFR 100 g/10 min, and Mw 70000.
(PPS-4): PPS resin with m.p. 280° C., MFR 600 g/10 min, and Mw 38000.
<Thermoplastic resin except the barrier layer-forming resin composition>
(β-1): high-density polyethylene with MFR 0.3 and density 0.94.
<Adhesive layer>
(γ-1): ethylene/glycidyl methacrylate copolymer.

TABLE 4

| | Item | Unit | Ex. 19 | Ex. 20 | Ex. 21 | Ex. 22 | Ex. 23 | Ex. 24 |
|---|---|---|---|---|---|---|---|---|
| Constituent Components of Barrier Layer (α) | Type of polyolefin resin (a) | — | PO-6 | PO-7 | PO-8 | PO-9 | PO-4 | PO-4 |
| | Amount of polyolefin resin | vol. % | 40 | 80 | 55 | 77 | 65 | 65 |
| | Type of PPS resin (b) | — | PPS-4 | PPS-5 | PPS-5 | PPS-5 | PPS-5 | PPS-4 |
| | Amount of PPS resin | vol. % | 60 | 15 | 40 | 20 | 30 | 30 |
| | Compatibilizer | vol. % | 5 | 5 | 5 | 3 | 5 | 5 |
| Layer (β) | Thermoplastic resin layer (neighboring layer) | | β-1 | β-1 | β-2 | β-3 | β-2 | β-3 |
| Layer (γ) | Adhesive layer | | γ-1 | γ-1 | γ-1 | γ-2 | γ-1 | γ-2 |

TABLE 4-continued

| Item | | Unit | Ex. 19 | Ex. 20 | Ex. 21 | Ex. 22 | Ex. 23 | Ex. 24 |
|---|---|---|---|---|---|---|---|---|
| Separated Morphology of Barrier Layer | | continuous phase | PPS | polyolefin | PPS and polyolefin | PPS and polyolefin | PPS | PPS |
| | | disperse phase | polyolefin | PPS laminar dispersion | — | — | polyolefin | polyolefin |
| Gasohol Barrier Properties | gasohol transmission (g · mm/m² · 24 h · atm) | | 0.54 | 0.82 | 0.63 | 0.75 | 0.70 | 0.56 |
| | Interlayer Adhesion Strength of Moldings (kg/10 mm) | | 2.6 | 4.7 | 4.5 | 4.4 | 3.9 | 3.8 |

<Polyolefin resin>
(PO-4): high-density polyethylene with MFR 0.3 and density 0.95.
(PO-6): low-density polyethylene with MFR 1.0 and density 0.92.
(PO-7): polypropylene with MFR 0.5 and density 0.89.
(PO-8): ethylene/ethyl acrylate copolymer with MFR 1.5 and density 0.93.
(PO-9): ethylene/propylene copolymer with MFR 0.6 and density 0.88.
<PPS resin>
(PPS-4): PPS resin with m.p. 280° C., MFR 600 g/10 min, and Mw 38000.
(PPS-5): PPS copolymer resin with m.p. 255° C. and MFR 800 g/10 min.
<Thermoplastic resin except the barrier layer-forming resin composition>
(β-1): high-density polyethylene with MFR 0.3 and density 0.94.
(β-2): polybutylene terephthalate
(β-3): nylon 11.
<Adhesive layer>
(γ-1): ethylene/glycidyl methacrylate copolymer.
(γ-2): ethylene/methyl acrylate/glycidyl methacrylate copolymer.

TABLE 5

| Item | | Unit | Ex. 25 | Ex. 26 | Ex. 27 | Ex. 28 | Ex. 29 | Ex. 30 | Ex. 31 | Ex. 32 |
|---|---|---|---|---|---|---|---|---|---|---|
| Constituent Components of Barrier Layer (α) | Type of polyolefin resin (a) | — | PO-5 | PO-4 | PO-4 | PO-4 | PO-5 | PO-5 | PO-4 | PO-4 |
| | Amount of polyolefin resin | vol. % | 62 | 65 | 65 | 65 | 50 | 77 | 65 | 65 |
| | Type of PPS resin (b) | — | PPS-4 | PPS-4 | PPS-4 | PPS-4 | PPS-4 | PPS-3 | PPS-5 | PPS-4 |
| | Amount of PPS resin | vol. % | 35 | 30 | 30 | 30 | 45 | 20 | 30 | 30 |
| | Compatibilizer | vol. % | 3 | 5 | 5 | 5 | 5 | 3 | 5 | 5 |
| Layer (β) | Thermoplastic resin layer (neighboring layer) | | β-1 | β-1 | β-1 | β-1 | β-4 | β-4 | β-2 | β-3 |
| Layer (γ) | Adhesive layer | | — | γ-3 | γ-4 | γ-5 | γ-3 | γ-5 | γ-5 | γ-5 |
| Separated Morphology of Barrier Layer | | continuous phase | polyolefin | PPS | PPS | PPS | PPS and polyolefin | polyolefin | PPS | PPS |
| | | disperse phase | PPS laminar dispersion | polyolefin | polyolefin | polyolefin | — | PPS laminar dispersion | polyolefin | polyolefin |
| Gasohol Barrier Properties | gasohol transmission (g · mm/m² · 24 h · atm) | | 0.75 | 0.69 | 0.70 | 0.68 | 0.76 | 0.89 | 0.71 | 0.57 |
| | Interlayer Adhesion Strength of Moldings (kg/10 mm) | | 2.0 | 5.2 | 5.0 | not peeled | not peeled | not peeled | not peeled | not peeled |

<Polyolefin resin>
(PO-4): high-density polyethylene with MFR 0.3 and density 0.95.
(PO-5): high-density polyethylene with MFR 6.0 and density 0.96.
<PPS resin>
(PPS-3): PPS resin with m.p. 280° C., MFR 100 g/10 min, and Mw 70000.
(PPS-4): PPS resin with m.p. 280° C., MFR 600 g/10 min, and Mw 38000.
(PPS-5): PPS copolymer resin with m.p. 255° C. and MFR 800 g/10 min.
<Thermoplastic resin except the barrier layer-forming resin composition>
(β-1): high-density polyethylene with MFR 0.3 and density 0.94.
(β-2): polybutylene terephthalate
(β-3): nylon 11.
(β-4): ethylene/butane copolymer.
<Adhesive layer>
(γ-3): maleic anhydride-modified ethylene/butene copolymer.
(γ-4): maleic anhydride-modified ethylene/octene copolymer.
(γ-5): maleic anhydride-modified polyolefin with tackifier.

The multi-layer structures obtained in Examples 16 to 32, which have a separated morphology defined in the invention, have good gasohol barrier properties and good interlayer adhesiveness, and their practical applicability is good. In addition, the structures obtained in these Examples were fabricated into multi-layer blow moldings, and they had good properties.

INDUSTRIAL APPLICABILITY

The thermoplastic resin structure of the invention has good vapor and/or liquid barrier properties, and has many applications in various fields. For example, it is favorable for electric and electronic appliances-related devices, precision machines-related devices, office-use appliances, automobiles and trains-related parts, building materials, wrapping and packaging materials, furniture, and daily necessaries. In addition, the multi-layer structure of the invention has good barrier properties against gasohol, and gives plastic containers and tubes having the advantages of strength, durability and workability. It is favorable for gasoline tanks for automobiles, containers and pipes for transportation and storage of liquid chemicals, and wrapping and packaging materials and containers for foods and medicines.

What is claimed is:

1. A thermoplastic resin structure formed of a resin composition that comprises substantially (a) from 55 to 80% by volume of a polyolefin resin and (b) from 20 to 45% by volume of a polyphenylene sulfide resin, which is characterized in that, in morphology therein seen through electronicmicroscopy, the polyphenylene sulfide resin (b) forms a matrix phase (continuous phase) and the polyolefin resin (a) forms a disperse phase.

2. The thermoplastic resin structure as claimed in claim 1, for which the blend ratio of the polyolefin resin (a) and the polyphenylene sulfide resin (b) is such that the former accounts for from 60 to 75% by volume and the latter for from 25 to 40% by volume.

3. The thermoplastic resin structure as claimed of claims 1 to 2, for which the polyolefin resin (a) is at least one selected from polyethylene, polypropylene, ethylene/α-olefin copolymers, [copolymers of (ethylene and/or propylene) and (unsaturated carboxylic acid and/or unsaturated carboxylate)], and [copolymers of (ethylene and/or propylene) and (unsaturated carboxylic acid and/or unsaturated carboxylate) in which at least a part of the carboxyl groups are modified into metal salts].

4. The thermoplastic resin structure as claimed in claim 1 or 2, which contains (c) from 0.5 to 200 parts by weight, relative to 100 parts by weight of the total of the polyolefin resin (a) and the polyphenylene sulfide resin (b), of an inorganic filler.

5. Containers for transportation or storage of liquid chemicals or gases, which are obtained by working the thermoplastic resin structure of claim 1 or 2.

6. Attached parts for containers for transportation or storage of liquid chemicals or gases, which are obtained by working the thermoplastic resin structure of claim 1 or 2.

7. Moldings of the thermoplastic resin structure of claim 1 or 2, which are formed through at least one method of injection molding, injection compression molding or compression molding.

8. A multi-layer structure with a barrier layer, in which the barrier layer is formed of the thermoplastic resin structure of claim 1 or 2.

9. The multi-layer structure as claimed in claim 8, wherein a neighboring layer is formed on one or both surfaces of the barrier layer, and the neighboring layer is a thermoplastic resin layer differing from the thermoplastic resin structure that forms the barrier layer.

10. The multi-layer structure as claimed in claim 9, wherein the thermoplastic resin to form the neighboring layer is at least one selected from polyolefin resins, thermoplastic polyester resins, polyamide resins, polycarbonate resins and ABS resins.

11. The multi-layer structure as claimed in claim 9, wherein the thermoplastic resin to form the neighboring layer is at least one selected from polyolefin resins, thermoplastic polyester resins and polyamide resins.

12. The multi-layer structure as claimed in claim 9, wherein the thermoplastic resin to form the neighboring layer is an ethylene homopolymer and/or an ethylene/α-olefin copolymer having a melt flow rate of form 0.01 to 30 g/10 min and a density of form 0.90 to 0.97 g/cm$^3$.

13. The multi-layer structure as claimed in claim 9, which has an adhesive layer formed between the barrier layer and the neighboring layer.

14. The multi-layer structure as claimed in claim 13, wherein the adhesive layer is formed of a modified polyolefin having a degree of crystallinity of at most 50% and containing from 0.01 to 10% by weight of an unsaturated carboxylic acid or its derivative grafted thereon.

15. The multi-layer structure as claimed in claim 14, wherein the adhesive layer comprises from 60 to 99 parts by weight of a modified polyolefin having a degree of crystallinity of at most 50% and containing from 0.01 to 10% by weight of an unsaturated carboxylic acid or its derivative grafted thereon, and from 1 to 40 parts by weight of a tackifier.

16. The multi-layer structure of as claimed in claim 8, which is formed through coextrusion.

17. The multi-layer structure as claimed in claim 8, which is formed into multi-layered tubes or multi-layered blow moldings through coextrusion.

* * * * *

UNITED STATES PATENT AND TRADEMARK OFFICE
CERTIFICATE OF CORRECTION

PATENT NO. : 6,830,792 B1
DATED : December 14, 2004
INVENTOR(S) : Matsuoka et al.

It is certified that error appears in the above-identified patent and that said Letters Patent is hereby corrected as shown below:

Column 12,
Line 26, please change "4-butanedlol" to -- -butanediol --.

Column 23,
Line 25, please change "200 $\mu$m" to -- 200 rpm --.

Signed and Sealed this

Twenty-sixth Day of April, 2005

JON W. DUDAS
*Director of the United States Patent and Trademark Office*